(12) United States Patent
Embley et al.

(10) Patent No.: US 8,103,962 B2
(45) Date of Patent: Jan. 24, 2012

(54) FORM-BASED ONTOLOGY CREATION AND INFORMATION HARVESTING

(75) Inventors: David W. Embley, Orem, UT (US); Cui Tao, Rochester, MN (US); Stephen W. Liddle, Orem, UT (US)

(73) Assignee: Brigham Young University, Provo, UT (US)

( * ) Notice: Subject to any disclaimer, the term of this patent is extended or adjusted under 35 U.S.C. 154(b) by 258 days.

(21) Appl. No.: 12/612,570

(22) Filed: Nov. 4, 2009

(65) Prior Publication Data
US 2010/0115436 A1    May 6, 2010

Related U.S. Application Data

(60) Provisional application No. 61/201,692, filed on Dec. 11, 2008, provisional application No. 61/111,273, filed on Nov. 4, 2008.

(51) Int. Cl.
*G06F 3/048* (2006.01)
(52) U.S. Cl. .................. 715/763; 715/780; 715/811
(58) Field of Classification Search ............. 715/763, 715/780, 811
See application file for complete search history.

(56) References Cited

U.S. PATENT DOCUMENTS

| | | | | |
|---|---|---|---|---|
| 7,698,129 | B2* | 4/2010 | Adachi et al. | 704/9 |
| 7,761,885 | B2* | 7/2010 | Labrou et al. | 719/330 |
| 7,917,417 | B2* | 3/2011 | Dion | 705/36 R |
| 7,962,495 | B2* | 6/2011 | Jain et al. | 707/755 |
| 2007/0178501 | A1* | 8/2007 | Rabinowitz et al. | 435/6 |
| 2010/0115436 | A1* | 5/2010 | Embley et al. | 715/763 |
| 2010/0312549 | A1* | 12/2010 | Akuwudike | 704/9 |

OTHER PUBLICATIONS

Noy and Musen, Anchor-Prompt: Using Non-Local Context for Semantic Matching, Stanford Medical Informatics, Date: n/a pp. 1-8.*
Tartir and Arpinar, Ontology Evaluation and Ranking using OntoQA, Department of Computer Science University of Georgia, Date: n/a, pp. 1-8.*
A. Arasu and E. Garcia-Molina, Extracting structured data from web pages, In Proceedings of the 2003 ACM SIGMOD International Conference on Management of Data (SIGMOD '03), 2003, pp. 337-348, San Diego, California.

(Continued)

*Primary Examiner* — William Bashore
*Assistant Examiner* — David Phantana Angkool
(74) *Attorney, Agent, or Firm* — Workman Nydegger (57) ABSTRACT

Extracting data from web pages. User input is received defining a tabular form. User input is received correlating portions of the form with user selected data items contained in one or more first web pages. The user input is correlated to create an ontology defining relationships between the user selected data items based on the definition of the tabular form. One or more other web pages are accessed, and based on a context of the one or more data items in the first web page being similar to a context of the selected data items in the one or more first web pages, one or more similar data items are extracted from the one or more other web pages. The extracted data items are correlated to each other in accordance with the ontology defining relationships between the user selected data items and are output as a user searchable data structure.

19 Claims, 5 Drawing Sheets

OTHER PUBLICATIONS

A. Dingli, et al., Automatic semantic annotation using unsupervised information extraction and integration, In Proceedings of the Third International Conference on Knowledge Capture (K-CAP'03) Workshop on Knowledge Markup and Semantic Annotation, Sanibel Island, Florida, Oct. 2003.

A. Gupta, et al., Virtual Database Technology, SIGMOD Record, 26(4) 1997 pp. 57-61.

A. Pivk, "Automatic ontology generation from Web tabular structures," AI Communications, 2006, 19(1):83-85.

A. Pivk, et al., "From tables to frames," In Proceedings of the Third International Semantic Web Conference (ISWC'04), pp. 166-181, Hiroshima, Japan, Nov. 2004.

A. Popov, et al., Kim—a semantic platform for information extraction and retrieval, Natural Language Engineering, (2004), 10:375-392.

A. Tengli, et al., "Learning Table Extraction from Examples," In Proceedings the 20th International Conference on Computational Linguistics (COLING '04), pp. 987-993, Geneva, Switzerland, Aug. 2004.

B. Adelberg, "NoDoSE—A Tool for Semi-Automatically Extracting Structured and Semistructured Data from Text Documents," SIGMOD '98, Seattle, WA (1998) pp. 283-294.

Baumgartner, R., et al., "Visual Web Information Extraction with Lixto," Proceedings of the 27th VLDB Conference, Rome, Italy, 2001, 10 pgs.

Bergamaschi, S., et al., "Semantic Integration of Semistructured and Structured Data Sources," SIGMOD Record, Mar. 1999, 28(1), pp. 54-59.

Berners-Lee, T., et al., "The Semantic Web," Scientific American. com, May 2001, 36(25), 36 pgs.

Biskup, J. & Embley, D., "Extracting information from heterogeneous information sources using ontologically specified target views". Information Systems 28 (2003), 169- 212.

Buitelaar, P. et al., "A Protégé Plug-In for Ontology Extraction from Text," in Proceedings of the International Semantic Web Conference (ISWC'03): Demo Session, Oct. 2003, pp. 31-44.

Burgun, A. and O. Bodenreider: 2001, "Comparing terms, concepts, and semantic classes in WordNet and the Unified Medical Language System," In: WordNet and Other Lexical Resources: Applications, Extensions, and Customizations; An NAACL-01 (North American Association for Computational Linguistics) Workshop, Pittsburgh, Pennsylvania, pp. 77-82.

C. Tao & D.W. Embley, "Automatic Hidden-Web Table Interpretation by Sibling Page Comparison," In Proceedings of the 26th International Conference on Conceptual Modeling (ER '07), pp. 566-581, Auckland, New Zealand, Nov. 2007.

C. Tao and D.W. Embley, "Seed-Based Generation of Personalized Bio-ontologies for Information Extraction," In Proceedings of the First International Workshop on Conceptual Modelling for Life Sciences Applications (CMLSA '07), pp. 74-84, Auckland, New Zealand, Nov. 2007.

Cali, A., et al., "On the Expressive Power of Data Integration Systems," Proc. of 21st International Conference on Conceptual Modeling (ER 2002) pp. 338-350.

Castano, S., et al., "Conceptual Schema Analysis: Techniques and Applications" ACM Transactions on Database Systems, Sep. 1998, 23(3), pp. 286-333.

Chartrand, T., "Ontology-Based Extraction of RDF Data from the World Wide Web," Master's thesis, 2003, Brigham Young University, Provo, Utah.

Chiang, R. et al., "Reverse engineering of relational databases: Extraction of an EER model from a relational database," Data & Knowledge Engineering 12(2), 1994, 107-142.

Clyde, S., D. Embley, and S. Woodfield: 1996, "Improving the Quality of Systems and Domain Analysis through Object Class Congruency," In: Proceedings of the International IEEE Symposium on Engineering of Computer Based Systems (ECBS '96). Friedrichshafen, Germany, pp. 44-51.

Crescenzi, V., et al., "RoadRunner: Towards Automatic Data Extraction from Large Web Sites," Proceedings of the 27th VLDB Conference (VLDB '01), Rome, Italy, 2001.

D.W. Embley, et al., "Table processing paradigms: A research survey," International Journal of Document Analysis and Recognition, 2006 8(2), pp. 66-86.

D.W. Embley et al., "Automatically Extracting Ontologically Specified Data from HTML Tables of Unknown Structure," In Proceedings of the 21st International Conference on Conceptual Modeling (ER '02), Oct. 2002, pp. 322-337.

D.W. Embley, et al., Automating the Extraction of Data from HTML Tables with Unknown Structure, Data & Knowledge Engineering, Jul. 2005, 54(1), pp. 3-28.

D.W. Embley, NFQL: The Natural Forms Query Language, ACM Transactions on Database Systems, 1989, 14(2), pp. 168-211.

D. Embley, et al., "A Conceptual-modeling approach to extracting data from the Web," Proc. 17th International Conference on Conceptual Modeling (ER '98) LNCS 1507, (1998) pp. 78-91.

D. Embley et al., "Record-boundary discovery in Web documents," SIGMOD '99 Philadelphia, PA, ACM (1999), pp. 467-478.

D. Embley, "Programming with data frames for everyday data items," Proc. 1980 National Computer Conference (1980) 301-305.

D. Embley, et al., "Object-Oriented Systems Analysis and Specification: A Model-Driven Approach," (Prentice Hall, 1992).

D. Embley, et al., "Ontology-Based Extraction and Structuring of Information from Data-Rich Unstructured Documents" Proc. Conference on Information and Knowledge Management, CIKM '98, Bethesda, MD, (1998) pp. 52-59.

D. Gale & L.S. Shapley, "College Admissions and the Stability of Marriage," American Mathematics Monthly, 1962, 69(1), pp. 9-14.

D. Konopnicki & O. Shmueli, "W3QS: A Query System for the World-Wide Web," Proc. 21st VLDB Conference, Zurich, Switzerland (1995) pp. 54-65.

D. Lythgoe, "The Next Generation of Genealogy Sitebuilding," Jan. 2008 available at: www.lythgoes.net/genealogy/software.php.

De Marchi, F. et al. "Analysis of Existing Databases at the Logical Level: the DBA Companion Project," SIGMOD Record 32(1), 2003, 47-52.

dlbeck.com: 2003, 'dlbeck.com'. www.dlbeck.com/population.htm.

Doan, A., et al., "Reconciling Schemas of Disparate Data Sources: A Machine-Learning Approach," Proceedings of the 2001 ACM SIGMOD International Conference on Management of Data (SIGMOD 2001). Santa Barbara, California, pp. 509-520.

Embley, D. & M. Xu, "Relational Database Reverse Engineering: A Model-Centric, Transformational, Interactive Approach Formalized in Model Theory," DEXA '97 Workshop Proceedings. Toulouse, France, 1997, pp. 372-377.

Embley, D.: 1998, Object Database Development: Concepts and Principles, Reading, Massachusetts: Addison-Wesley.

Embley, D., et al., "Conceptual-Model-Based Data Extraction from Multiple-Record Web Pages," Data & Knowledge Engineering 1999, 31(:3), pp. 227-251.

Embley, D. et al., "Multifaceted Exploitation of Metadata for Attribute Match Discovery in Information Integration," Proceedings of the International Workshop on Information Integration on the Web (WIIW'01) Rio de Janeiro, Brazil, 2001 pp. 110-117.

FamilySearch, Wikipedia, Jan. 2008, available at: www.en.wikipedia.org/wiki/FamilySearch.

Fellbaum, C., WordNet: An Electronic Lexical Database, Computational Linguistics, 1998 25(2), pp. 292-296, Cambridge, Massachussets: MIT Press.

Frakes, W., Baeza-Yates, R: Information Retrieval: Data Structures & Algorithms, (Prentice Hall, 1992).

G. Arocena & A. Mendelzon, "WebOQL: Restructuring Documents, Databases and Webs," Proc. Fourteenth International Conference on Data Engineering (1998).

Gruber, T. R. "Towards Principles for the Design of Ontologies Used for Knowledge Sharing," In: N. Guarino and R. Poli (eds.): Formal Ontology in Conceptual Analysis and Knowledge Representation, Revision Aug. 23, 1993.

Guarino, N. 1998, "Formal Ontology and Information Systems," In: N. Guarino (ed.) Proceedings of the First International Conference on Formal Ontology in Information Systems (FOIS '98), Trento, Italy, 1998, pp. 3-15.

H. Campbell, "Enabling the Distributed Family Tree," Master's Thesis Proposal, Brigham Young University, Provo, Utah, Nov. 2006.

H. Chen, et al., Mining tables from large scale HTML texts, In Proceedings of the 18th International Conference on Computational Linguistics (COLING '00), Jul.-Aug. 2000, pp. 166-172, Saarbrücken, Germany.

Hainaut, J.L. "Database Reverse Engineering: Models, Techniques and Strategies," 10th Entity-Relationship Conference, San Mateo, 1991.

J. Hammer, et al., "Extracting Semistructured Information from the Web," In Proc. of the Workshop on Management of Semistructured Data (1997) pp. 18-25.

J. Cowie & W. Lehnert, "Information Extraction," Communications of the ACM, Jan. 1996, 39(1), pp. 80-91.

Jena—A Semantic Web Framework for Java, 2008, available at: http://jena.sourceforge.net/.

K. Lerman, et al., "Using the Structure of Web Sites for Automatic Segmentation of Tables," In Proceedings of the 2004 ACM SIGMOD International Conference on Management of Data (SIGMOD '04), Jun. 2004, pp. 119-130, Paris, France.

K.C. Tai, "The tree-to-tree correction problem," Journal of the ACM, 26(3):422-433, 1979.

Kalfoglou, Y. & Schorlemmer, M. "Ontology Mapping: The State of the Art," The Knowledge Engineering Review, 2003 18(1), 1-31.

Kantola, M., et al., "Discovering Functional and Inclusion Dependencies in Relational Databases," International Journal of Intelligent Systems 7, 591-607 (1992).

Kushmerick, N., "Wrapper Induction for Information Extraction," Proc. 1997 International Joint Conference on Artificial Intelligence (1997) pp. 729-735.

L. Delcambre, et al., "Structured Maps: modeling explicit semantics over a universe of information," International Journal on Digital Libraries 1 (1997) pp. 20-35.

Lakshmanan, L., et al., "A Declarative Language for Querying and Restructuring the Web" Proc. 6th International Workshop on Research Issues in Data Engineering, RIDE '96 (1996).

Lemke, J. "Multiplying Meaning: Visual and Verbal Semiotics in Scientific Text," In: J. Martin and R. Veel (eds.): Reading Science: Critical and Functional Perspectives on Discourses of Science, Routledge, 1998, pp. 87-113.

Li, W. S. & Clifton, C. "Semantic Integration in Heterogeneous Databases Using Neural Networks," In: Proceedings of the 20th Very Large Data Base Conference, 1994 Santiago, Chile, 12 pages.

Liddle, S., et al., "Unifying Modeling and Programming through an Active, Object-Oriented, Model-Equivalent Programming Language," Proc. 14th International Conference on Object-Oriented and Entity-Relationship Modeling (1995) pp. 55-64.

Lonsdale, D. et al. "Peppering Knowledge Sources with SALT: Boosting conceptual content for ontology generation," In: Proc. of the AAAI Workshop: Semantic Web Meets Language Resources, 2002, Edmonton, Alberta, Canada, pp. 30-36.

Lopresti, D. & Nagy, G., "A Tabular Survey of Table Processing," In: A. Chhabra and D. Dori (eds.): Graphics Recognition-Recent Advances, Lecture Notes in Computer Science, LNCS 1941 Springer Verlag 2000, pp. 93-120.

Luger, G.F., Stubblefield, W.A.: Artificial Intelligence: Structures and Strategies for Complex Problem Solving, Third Edition, Addison Wesley Longman, Inc., (1998).

M.J. Al-Muhammed, Ontology Aware Software Service Agents: Meeting Ordinary User Needs on the Semantic Web. PhD thesis, Brigham Young University, Dec. 2007.

M. Vargas-Vera, et al., "MnM: Ontology Driven Semi-automatic and Automatic Support for Semantic Markup," In Proceedings of the 13th International Conference on Knowledge Engineering and Knowledge Management (EKAW '02), pp. 379-391, Siguenza, Spain, Oct. 2002.

Madhavan, J. et al., "Generic Schema Matching with Cupid," In: Proceedings of the 27th International Conference on Very Large Data Bases (VLDB '01). Rome, Italy, 2001 pp. 49-58.

Maier, D.: 1983, The Theory of Relational Databases. Rockville, Maryland: Computer Science Press, Inc.

Maier, D. & Delcambre, L. "Superimposed Information for the Internet," In: S. Cluet and T. Milo (eds.): Proceedings of the ACM SIGMOD Workshop on the Web and Databases 1999, Philadelphia, Pennsylvania.

Markowitz, V. & Makowsky, J. A., "Identifying Extended Entity-Relationship Object Structures in Relational Schemas," IEEE Transactions on Software Engineering 16(8), 1990, pp. 777-790.

McGuinness, D., et al., "An Environment for Merging and Testing Large Ontologies," In: Proceedings of the Seventh International Conference on Principles of Knowledge Representation and Reasoning, Breckenridge, Colorado, 2000, pp. 483-493.

Mendelzon, A., et al., "Querying the World Wide Web," International Journal on Digital Libraries 1 (1997) pp. 54-67.

Mendelzon, A., et al., "Querying the World Wide Web," Proc. First International Conference on Parallel and Distributed Information Systems (PDIS'96) (1996).

Milo, T. & Zohar, S., "Using Schema Matching to Simplify Heterogeneous Data Translation," In: Proceedings of the 24th VLDB Conference, 1998, pp. 122-133.

Mizoguchi, R. & Ikeda, M. "Towards Ontology Engineering," In: proceedings of the Joint 1997 Pacific Asian Conference on Expert Systems / Singapore International Conference on Intelligent Systems Singapore, 1997, pp. 259-266.

MostSpokenLangnages: "The 30 Most Spoken Languages of the World," 2003, available at: www.krysstal.com/spoken.html.

N. Ashish, C. Knoblock, "Wrapper Generation for Semi-structured Internet Sources," SIGMOD Record, 26(4), Dec. 1997, pp. 8-15.

N. F. Noy, et al., "Creating Semantic Web Contents with Protégé-2000," IEEE Intelligent Systems, Mar./Apr. 2001, 16(2):60-71, Mar./Apr. 2001.

Nestorov, S., et al. "Extracting Schema from Semistructured Data," In: Proceedings of the 1998 ACM SIGMOD International Conference on Management of Data (SIGMOD'.98), Seattle, Washington, 1998, pp. 295-306.

P. Atzeni, et al., "To Weave the Web," Proc. Twenty-third VLDB Conference, Athens, Greece, (1997) 206-215.

P. Atzeni & G. Mecca, "Cut and Paste," Proc. PODS '97, Tucson, AZ (1997) 144-153.

P. Buitelaar, et al., A Protégé plug-in for ontology extraction from text based on linguistic analysis. In Proceedings of the First European Semantic Web Symposium, (ESWS '04), 2004, pp. 31-44, Heraklion, Greece.

P. Buneman, et al., "A Query Language and Optimization Techniques for Unstructured Data," Proc. SIGMOD '96, Montreal, Canada, (1996) 505-516.

P. Cimiano et al., Towards the self-annotating web, In Proceedings of the 18th International Conference on World Wide Web (WWW '04), May 2004, pp. 462-471, New York, New York.

P. Cimiano and J. Völker, "Text2Onto—a framework for ontology learning and data-driven change discovery," In Proceedings of the 10th International Conference on of Natural Language to Information Systems (NLDB'05), pp. 227-238, Alicante, Spain, Jun. 2005.

P.G. Ipeirotis et al., Probe, "Count, and Classify: Categorizing Hidden Web Databases," In Proceedings of the 2001 ACM SIG-MOD International Conference on Management of Data (SIGMOD '01), May 2001, pp. 67-78, Santa Barbara, California.

P. Kogut & W. Holmes, "AeroDAML: Applying Information Extraction to Generate DAML Annotations from Web Pages," In Proceedings of the First International Conference on Knowledge Capture (K-CAP '01) Workshop on Knowledge Markup and Semantic Annotation, Victoria, British Columbia, 2001.

P. Spyns, D. Oberle,R. Volz, J. Zheng, M. Jarrar, Y. Sure, R. Studer, and R. Meersman, OntoWeb—a semantic web community portal, In *Proceedings of the 5th International Conference on Practical Aspects of Knowledge Management (PAKM '02)*, pp. 189-200, Vienna, Austria, Dec. 2002.

R. Doorenbos, et al., "A Scalable Comparison-Shopping Agent for the World-Wide Web," International Conference on Autonomous Agents (1997) 39-48.

R. Navigli, et al., "Quantitative and Qualitative Evaluation of the OntoLearn Ontology Learning System," In Proceedings of the 20th International Conference on Computational Linguistics, Aug. 2004, pp. 1043-1050, Geneva, Switzerland.

R. Zanibbi, et al., "A survey of table recognition," International Journal of Document Analysis and Recognition, 7(1):1-16, 2004.

Rahm, E. & Bernstein, P., "A Survey of Approaches to Automatic Schema Matching," The VLDB Journal 10: 334-350 (2001).

S. Abiteboul, et al., "Querying documents in object databases," International Journal on Digital Libraries 1(1) pp. 5-9 (1997).

S. Abiteboul, et al., "The Lorel query language for semistructured data," International Journal on Digital Libraries (1997) 1:66-88.

S. Chawathe, et al., The TSIMMIS Project: Integration of Heterogeneous Information Sources, IPSJ Conference (1994) 7-18.

S. Dill, et al., "A case for automated large-scale semantic annotation," Journal of Web Semantics: Science, Services and Agents on the World Wide Web, Dec. 2003, 1(1):115-132.

S. Handschuh, et al., "S-CREAM—Semi-automatic CREAtion of Metadata," In Proceedings of the 13th International Conference on Knowledge Engineering and Knowledge Management (EKAW '02), Oct. 2002, pp. 358-372.

S. Lim and Y. Ng, "An Automated Approach for Retrieving Hierarchical Data from HTML Tables," In Proceedings of the Eighth International Conference on Information and Knowledge management (CIKM '99), Nov. 1999, pp. 466-474, Kansas City, Missouri.

Schoop, M., et al., "Enhancing Decision and Negotiation Support in Enterprise Networks Through Semantic Web Technologies," In: XML Technologien fur das Semantic Web—XSW 2002, Proceedings zum Workshop pp. 161-167.

Soderland, S. "Learning to Extract Text-based Information from the World Wide Web," Proc. Third International Conference on Knowledge Discovery and Data Mining (KDD '97) 4 pgs.

SPARQL Query Language for RDF, W3C Recommendation, Jan. 15, 2008, available at: http://www.w3.org/TR/rdf-sparql-query/.

Spyns, P., et al. "Data Modelling Versus Ontology Engineering," SIGMOD Record 31(4), 2002, pp. 12-17.

Smith, D. & Lopez, M. "Information extraction for semi-structured documents," Proc. of the Workshop on Management of Semistructured Data (1997) 7 pgs.

Tijerino, Y., et al., "Ontology Generation from Tables," In: Proceedings of the 4th International Conference on Web Information Systems Engineering (WISE03), Rome, Italy, 2003 pp. 242-249.

The W3C architecture domain, 2004, available at: http://www.w3.org/com.

TopoZone2002, "TopoZone," 2002, available at: www.topozone.com.

W. Gatterbauer & P. Bohunsky, "Table Extraction Using Spatial Reasoning on the CSS2 Visual Box Model," In Proceedings of the 21st National Conference on Artificial Intelligence (AAAI '06), 2006, pp. 1313-1318.

W. Gatterbauer, et al., "Towards Domain-Independent Information Extraction from Web Tables," In Proceedings of the 16th International World Wide Web Conference (WWW '07), May 2007 pp. 71-80, Banff, Canada.

W. Holzinger, et al., "Using Ontologies for Extracting Product Features from Web Pages," In Proceedings of the Fifth International Semantic Web Conference (ISWC '06), Nov. 2006, pp. 286-299.

W. Yang, "Identifying Syntactic Differences Between Two Programs," Software Practice and Experience, 21(7):739-755, Jul. 1991.

Wang, K. & Liu, H. "Schema Discovery for Semistructured Data," In: Proceedings of the Third International Conference on Knowledge Discovery and Data Mining, Newport Beach, California, 1997 pp. 271-274.

WorldAtlas2003, "WorldAtlas.Com," available at: www.worldatlas.com/geoquiz/thelist.htm.

WorldFactbook2003 "The World Factbook—2003" available at: www.cia.gov/cia/publications/factbook.

Worm base, 2005, available at http://www.wormbase.org.

W.W. Cohen, et al., "A flexible learning system for wrapping tables and lists in HTML documents," In Proceedings of the 11th International World Wide Web Conference (WWW '02), May 2002, pp. 232-241, Honolulu, Hawaii.

XML Path Language (XPath) 2006, copyright 1999, available at: http://www.w3.org/TR/xpath.

X. Wang, "Tabular Abstraction, Editing, and Formatting," PhD thesis, University of Waterloo, 1996.

Xu, L. & Embley, D. "Using Domain Ontologies to Discover Direct and Indirect Matches for Schema Elements," In: Proceedings of the Workshop on Semantic Integration (WSI'03), Sanibel Island, Florida, 2003, pp. 105-110.

Y. Ding, et al., "Automatic creation and simplified querying of semantic web content: An approach based on information-extraction ontologies," In Proceedings of the First Asian Semantic Web Conference (ASWC '06), pp. 400-414, Beijing, China, Sep. 2006.

Y. Ding, et al., Enriching OWL with instance recognition semantics for automated semantic annotation, In Proceedings of the First International Workshop on Ontologies and Information Systems for the Semantic Web (ONISW '2007), Nov. 2007, pp. 160-169.

Y. Ding, et al., "Generating ontologies via language components and ontology reuse," In Proceedings of 12th International Conference on Applications of Natural Language to Information Systems (NLDB '07), Paris, France, Jun. 2007.

Y. Zhai & B. Liu, "Web Data Extraction Based on Partial Tree Alignment," In Proceedings of the 14th International Conference on World Wide Web (WWW '05), pp. 76-85, Chiba, Japan, May 2005.

Y. Wang & J. Hu, "A Machine Learning Based Approach for Table Detection on the Web," In Proceedings of the 11th International Conference on World Wide Web (WWW '02), pp. 242-250, Honolulu, Hawaii, May 2002.

Y. Wang, et al., "Towards Semi-automatic Ontology Building Supported by Large-scale Knowledge Acquisition," in AAAI Fall Symposium on Semantic Web for Collaborative Knowledge Acquisition, vol. FS-06-06, pp. 70-77, Arlington, Virginia. Oct. 2006.

Y. Zhou, Generating data-extraction ontologies by example. Master's thesis, Brigham Young University, Dec. 2005.

Y.A. Tijerino, et al., "Towards ontology generation from tables," World Wide Web: Internet and Web Information Systems, 8(3):261-285, Sep. 2004.

* cited by examiner

Left panel (100(b)):

| Country | | |
|---|---|---|
| Name | + Czech Republic | |
| 122a — Capital | / + Prague | |
| 124a — Geographic Coordinate | / + | ← 244a |
| Religion | / + | ← 206d |
| 206c — atheist | | |
| 126a — Roman Catholic | | |
| Protestant | | |
| Orthodox | | |
| other | | |

| Population | Year | |
|---|---|---|
| / + 10,264,212 | 2001 | |
| 8,015,315 | 2050 | |

Life Expectancy

| ☐ Male Life Expectancy | / + 71.23 |
| ☐ Female Life Expectancy | / + 78.43 |

| Area: | Water: | / + |
| | Land: | / + |
| | Total: | / + 78,866.00 |

206b, 206a labels

Right panel (200):

| | |
|---|---|
| Country (long form) | Czech Republic |
| Capital | Prague |
| Total Area | 30,450.33 sq. mi. |
| | 78,856.00 sq. km. |
| | (slightly smaller than South Carolina) |
| Population | 10,264,212 (July 2001 est.) |
| Estimated Population (in 2005) | 8,015,315 |
| Languages | Czech |
| Literacy | 99.9% total, N/A% male, N/A% female (1999 est.) |
| Religions | atheist 39.8%, Roman Catholic 39.2% Protestant 4.6%, Orthodox 3%, other 13.4% |
| Life Expectancy | 71.23 male, 78.43 female (2001 est.) |
| Government Type | parliamentary democracy |
| Currency | 1 koruna (Kc) = 1 haleru |
| GDP (per capita) | $12,900 (2000 est.) |
| Industry | Metallurgy, machinery and equipment, motor vehicles, glass ornaments |
| Agriculture | wheat, potatoes, sugar beets, hops, fruit, pigs poultry |
| Arabic Land | 41% |
| Natural Resources | Hard coal, soft coal, kaolin, clay, graphite, timber |

Figure 3

Figure 4

FORM-BASED ONTOLOGY CREATION AND INFORMATION HARVESTING

CROSS-REFERENCE TO RELATED APPLICATIONS

This application claims the benefit of U.S. Provisional application 61/201,692, titled "Embodiments: Form-based Ontology Creation and Information Harvesting" filed Dec. 11, 2008, and U.S. Provisional application 61/111,273 filed Nov. 4, 2008, titled "HIDDEN-WEB TABLE INTERPRETATION, CONCEPTULIZATION AND SEMANTIC ANNOTATION", each of which are incorporated herein by reference in their entireties.

STATEMENT REGARDING FEDERALLY SPONSORED RESEARCH OR DEVELOPMENT

This invention was made with government support under Grant No. 0414644 awarded by The National Science Foundation. The government has certain rights in the invention

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Computer interconnection has allowed content providers and content consumers to quickly and easily share information. For example, using wide area networks, such as the Internet, a content provider can create a web site which includes content that the content provider would like to share with content consumers. The content consumers can then access the web site to obtain the content. In fact, sharing content has become so simple that huge volumes of content are constantly being created. The sheer amount of content being created has presented additional difficulties. In particular, while the content desired by a content consumer may be freely available on some web site, the content may nonetheless the less success a bowl or on accessible in that the content is part of an overall larger amount of content. Thus, content consumers have the proverbial "needle in a haystack" problem.

Additionally, content consumers may be desirous to obtain content formatted in a fashion or organized in a fashion that suits a content consumer's particular purpose. For example, the content consumer may want to correlate certain data types with other data types. In a detailed and specific example, the content consumer may wish to correlate a particular disease with the organism causing the disease, further correlated to frequency of the disease. However, web page designers will often use their own views to present online information. The web site can provide a large amount of information about a topic in great detail. However, the user may only need a relatively small and specific part of the information. Web page resources typically do not allow users to query with their own view and often do not allow for user queries at all. Users may have to manually browse pages and filter out unneeded information to find the information of interest.

Additionally, the user may not be able to find all of the information needed for the content consumers purposes in a single web site. Thus, a user may need to manually search several online repository is to gather information of interest.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein is directed to a method practiced in a computing environment. The method includes acts for extracting data from web pages and organizing the extracted data in a user searchable format. The method includes at a graphical user interface, receiving user input defining a tabular form. The method further includes at the graphical user interface, receiving user input correlating one or more portions of the form with one or more user selected data items contained in one or more first web pages. A computer module correlates the user input to create an ontology defining relationships between the user selected data items based on the definition of the tabular form. A computer module accesses one or more other web pages, and based on a context of the one or more data items in the first web page being similar to a context of the selected data items in the one or more first web pages, extracts one or more similar data items from the one or more other web pages. A computer module correlates the extracted data items to each other in accordance with the ontology defining relationships between the user selected data items. A computer module outputs the correlated extracted data items as a user searchable data structure.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments are directed to allowing a user to define a table, sometimes referred to herein as a tabular form. The user can correlate portions of the form to data items selected from one or more first web pages. This correlation can be used to create an ontology defining relationships between selected data items based on the definition of the tabular form. One or more other web pages can be accessed, and based on a context of the one or more data items in the first web page being similar to a context of the selected data items in the one or more first web pages, one or more similar data items can be extracted from the one or more other web pages. The extracted data items can be correlated to each other in accordance with the ontology defining relationships between the user selected data items. The correlated extracted data items can be output as a user searchable data structure.

Examples are now illustrated of embodiments and instrumentalities that allow users to generate forms that describe information that a user wishes to harvest, generate an ontology according to the user-created forms, alter the forms if desired, and to annotate and harvest information with respect to views represented by the forms.

Form Creation and Annotation

To personalize information harvesting, users can be provided with a tool with which they can give their view of a domain without knowledge of conceptual modeling or ontology languages. In one example, forms can be used to specify and gather information. In particular, a graphical user interface may be provided to a user that allows the user to generate a form that describes the information that a user wishes to harvest.

Embodiments may be implemented where a graphical user interface is implemented using computing modules running on and interfacing with computer hardware. The graphical user interface may have different modes of operation including a form creation mode and a form annotation mode. The form creation mode allows users to create forms with different structures based on the way that the user wants to organize information. The form annotation mode allows users to annotate pages with respect to created forms, such as by selecting data instances for inclusion in a form location.

Illustrating now form creation, an illustrated form-creation mode provides users with an intuitive method for defining different kinds of form features. The embodiment illustrated includes basic form elements from which users can choose. In this example, one embodiment includes the ability to add: single-label/single-value elements, single-label/multiple-value elements, multiple-label/multiple-value elements, mutually-exclusive choice elements, and non-exclusive choice elements.

Figure 1A:
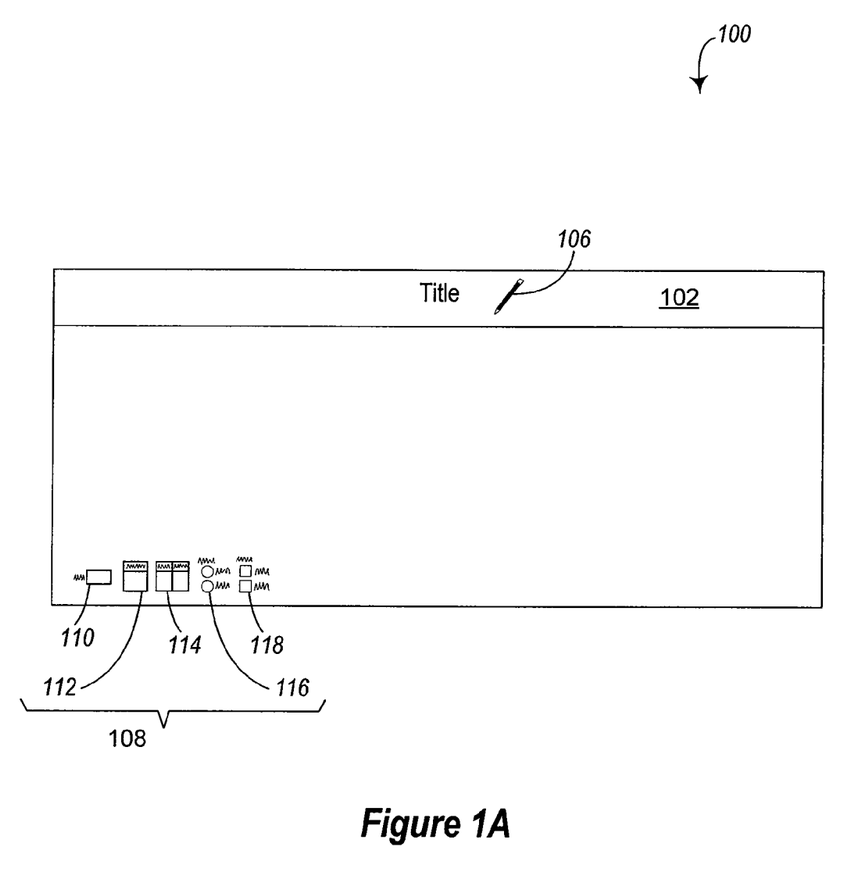
FIG. 1A illustrates an example blank form.

As illustrated in FIG. 1A, initially, a user starts with a blank form 100 with an empty title field 102. A set 108 of insert icons, implemented in this example as user interface buttons, appears inside the blank form and the edit-label icon 106 appears in the empty title. By clicking on the edit-label icon 106, a user can add or edit the title. By clicking on one of the icons in the blank form in the set 108 of insert icons, the user can add new form elements to the form 100. In the example illustrated, the icons in the set 108 of icons includes: single-label/single-value element icon 110, single-label/multiple-value element icon 112, multiple-label/multiple-value element icon 114, mutually-exclusive choice element icon 116, and non-exclusive choice element icon 118.

When a user clicks on the single-label/multiple-value element icon 112, for example, a single-label/multiple-value element appears. The insert icon set 108 then appears below the single-label/multiple-value element so that a user can add additional form elements. Other instances of icon sets similar to the icon set 108 also appear inside the single-label/multiple-value element so that a user can add other form elements nested inside the single-label/multiple-value element.

As will be illustrated in further examples below, embodiments may also include an add column or choice icon. By clicking on an add column or choice icon, a user can add additional columns to a multiple-column element and additional choices to a choice element.

Figure 1B:
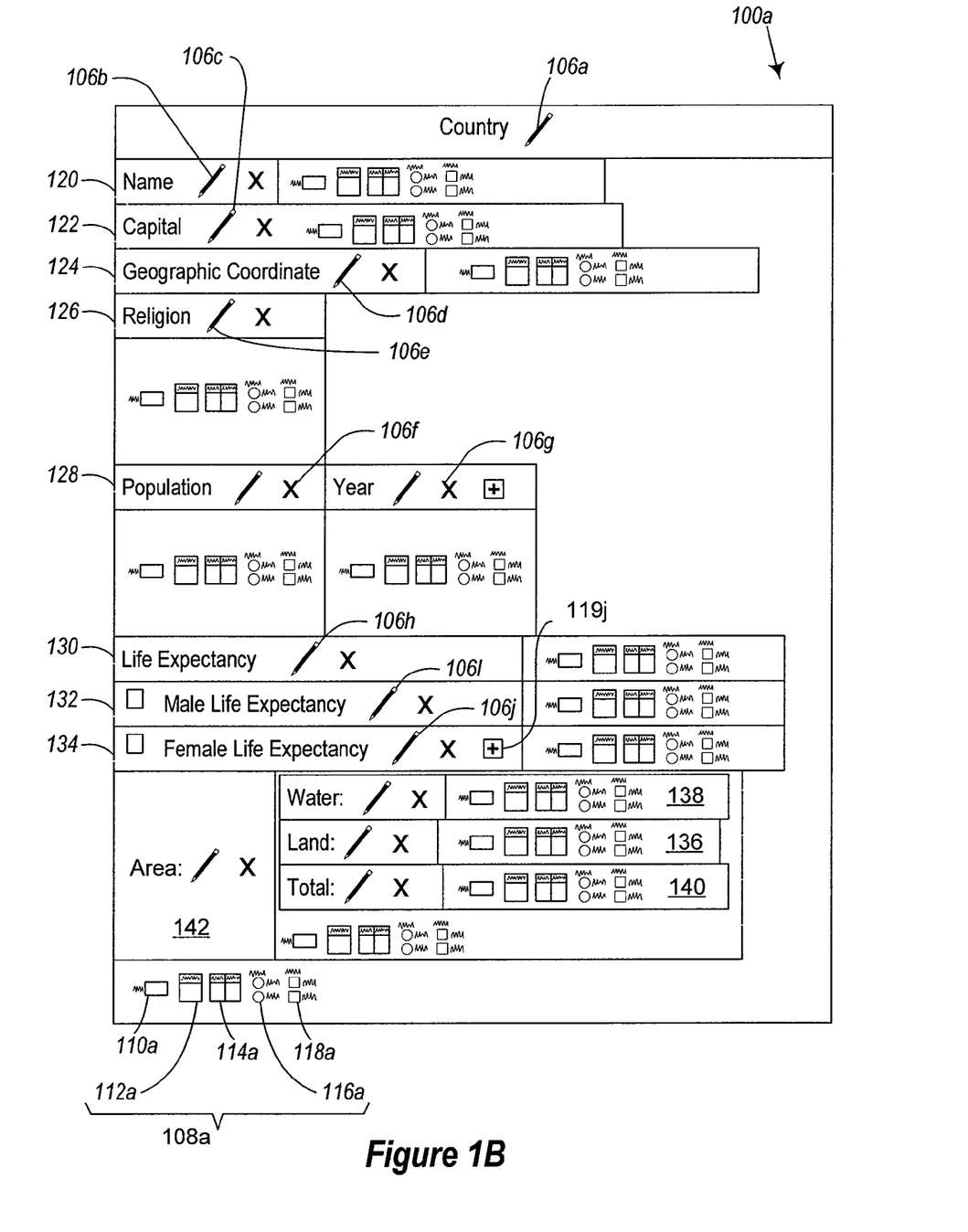
FIG. 1B illustrates an example populated form.

FIG. 1B shows an example of form creation for form 100a. Suppose a user is interested in basic information about countries (their names, locations, populations, etc.). In the illustrated example, the user may choose "Country" as the base-form title by clicking the edit label icon 106a and editing the title to "Country".

In the illustrated view, the user may want each country to have one name, capital, and geographic coordinate, so the user may add three single-label/single-value elements 120, 122 and 124 to the form and label them "Name" (i.e. element 120), "Capital" (i.e. element 122), and "Geographic Coordinate" (i.e. element 124) using the single-label/single-value element icon 110a and the edit label icons 106b, 106c, and 106d respectively.

Inasmuch as the user may know there might be one or more religions in a country, the user may choose to add a single-label/multiple-value form element 126 using the single-label/multiple-value form element icon 112a and label it "Religion" using the edit label icon 106e.

The user may want to keep track of population of a country for each of several years. Therefore, the user may create a multiple-label/multiple-entry field element 128 labeled "Population" and "Year" using the multiple-label/multiple-value element icon 114 and the edit label icons 106f and 106g.

The user may also be interested in the life expectancy for people in each country depending on the gender. As the same life-expectancy values can be for either gender, the user may add a non-exclusive choice form element 130 labeled "Life Expectancy" using the non-exclusive choice element icon 118 and the edit label icon 106h and label the choices to be a "Male Life Expectancy" choice element 132 and a "Female Life Expectancy" choice element 134 using the edit label icons 106i and 106j. As noted, previously, multiple-column elements and choice elements may include an add column or choice icon such as is illustrated at 119j for adding additional choices. This is illustrated in FIG. 1B by choice icon.

Land, water, and total area may also be of interest. Each country has an area, and the area has the three properties land, water, and total. The user may thus nest each of these properties as single-label/single-value elements 136, 138, and 140 labeled "Land", "Water" and "Total" respectively, within the single-label/single-value element 142 labeled "Area" as illustrated in FIG. 1B.

The user may annotate a page from a web site with respect to a created form by filling in the form. Embodiments provides users with a GUI in which they can open a page in a web site from which they want to collect information, highlight the value or values of interest for each form field, then fill the values into created forms.

Figure 2:
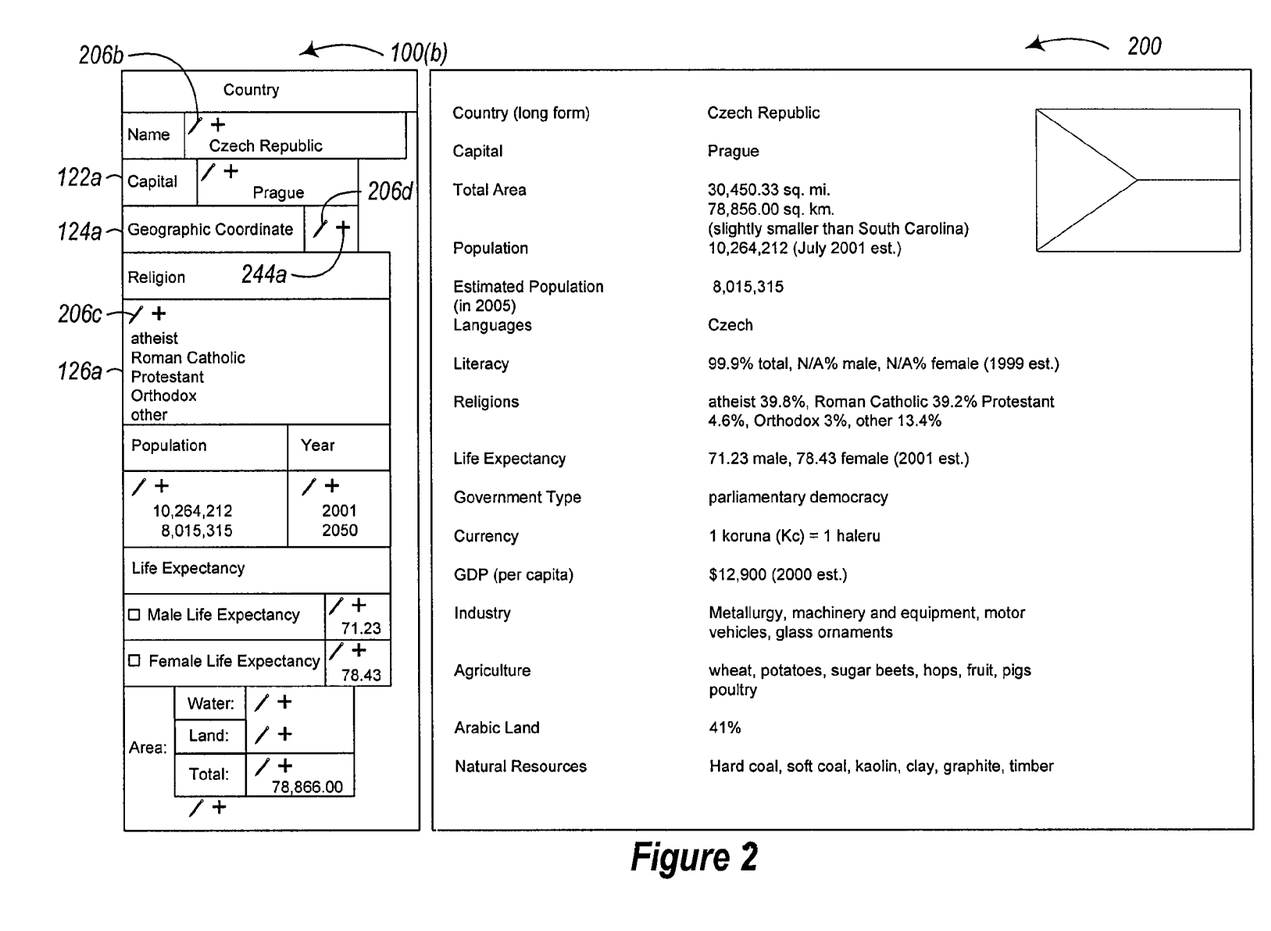
FIG. 2 illustrates the use of a form with a web page.

FIG. 2 shows an example of annotating values from a web page 200 using a form instance 100b. The left hand side shows the filled-in form 100b in the annotation mode. The right hand side shows a sample web page 200 in a domain. For example, to annotate the string "Prague" in the source web page 200 as a capital under the "Capital" element 122a, the user may highlight the string "Prague" by dragging the mouse over it and clicking on the insert icon 206b in the single entry Capital field. Embodiments automatically add "Prague" to the Capital form field 122b.

The user can also add more values in one form entry. For example, there are several religions in the Czech Republic. The user may highlight each of the values "atheist", "Roman Catholic", "Protestant", "Orthodox", and "other" in the source web page 200 individually and click on the insert icon 206c one by one. Then these five values appear in the corresponding form field 126a as five data instances.

The user can also concatenate two or more highlighted values when filling a form by clicking the concatenate icon. For example, suppose there is a website that provides us with geographic coordinate information by listing longitude and latitude separately. The user may first highlight the longitude value and then click on the insert icon 206d. To concatenate the latitude values, the user may highlight the latitude value and click on the concatenate icon 244a. Then the longitude and latitude value will appear as one concatenated data instance in the Geographic Coordinate form field 124a.

Ontology Generation

Figure 3:
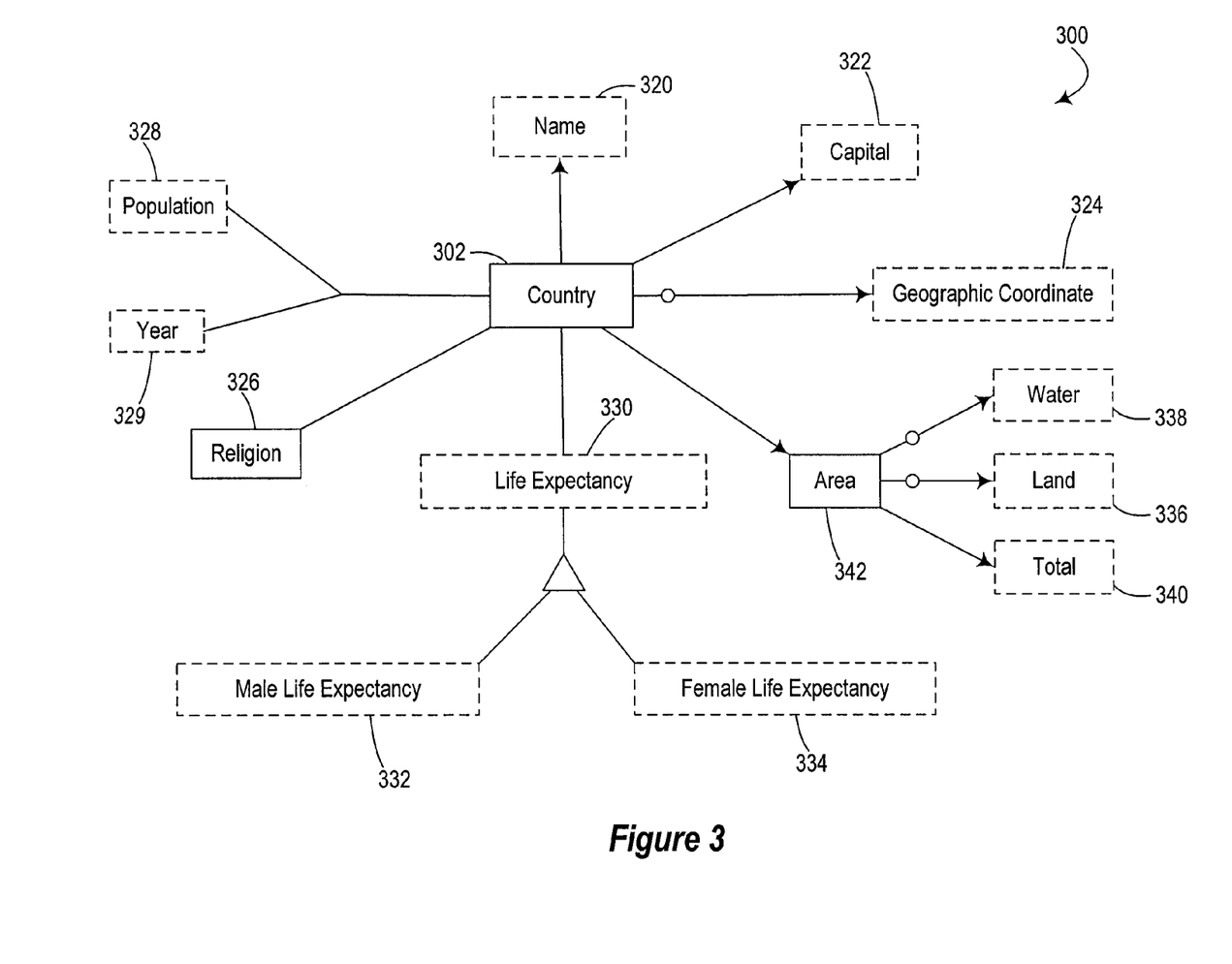
FIG. 3 illustrates an example ontology.

For a created form, Embodiments can generate an ontology inferred from the form. Some embodiments described herein create ontologies defined by the OSM ontology language. FIG. 3 shows a generated ontology 300 for the form in FIG. 1B. Based on the form title, some embodiments generate a new ontology and a non-lexical concept with this title as the name. Thus, for the form in 1B, some embodiments generate the concept 302 Country as FIG. 3 shows. Every label in the form also represents a concept in the corresponding ontology; the label is the name for the concept. Form concepts with nested components become non-lexical object sets. Thus, the Area concept 342 is a non-lexical object set. Form concepts without nested components become lexical object sets. Thus, the Name concept 320, the Capital concept 322, the Geographical Coordinate concept 324, the Religion concept 326, the Population concept 328, the Year concept 329, the Land concept 336, the Water concept 338, and the Total concept 340 are all lexical.

As a consistency requirement, generalization/specialization concepts are all lexical or are all non-lexical. To meet this requirement, some embodiments declare all the object sets involved in a generalization/specialization to be lexical if there are no nested components other than the nesting of generalization/specialization components themselves; otherwise all concepts are non-lexical. Inasmuch as there are no non-generalization/specialization form components nested under, the Life Expectancy concept 330, the Male Life Expectancy concept 332, and the Female Life Expectancy concept 334 are all lexical.

Some embodiments generate relationship sets among the concepts as follows.

Single-label/single-value form elements. Between the form-title concept, illustrated herein by T, and each top-level single-label/single-value form element, illustrated herein by S, some embodiments generate a functional binary relationship set from T to S. Thus, in the example illustrated, some embodiments would generate functional relationship sets from the Country concept 302 to the Name concept 320, from the Country concept 302 to the Capital concept 322, from the Country concept 302 to the Geographical Coordinate concept 324, and from the Country concept 302 to the Area concept 342 as illustrated in FIG. 3. Similarly, between each form element, illustrated herein by E, and a single-label/single-value form element S nested in side of E, some embodiments also generate a functional binary relationship set from E to S. Thus, in the example illustrated some embodiments would generate functional relationships from the Area concept 342 to the Land concept 136, from the Area concept 342 to the Water concept 138, and from the Area concept 342 to the Total concept 140.

Single-label/multiple-value form elements. Between each form-title concept T and each single-label/multiple-value concept M, some embodiments generate a non-functional binary relationship set between T and M. Thus, in the example illustrated, some embodiments accommodate the possibly of many Religions for each Country as FIG. 1B shows. Although the present running example has no single-value/multiple-value form elements nested inside other form elements, some embodiments also create non-functional binary relationship sets between a parent form element and each nested child single-label/multiple-value form element.

Multiple-label/multiple-value form elements. Between the form-title concept and each multiple-label form element as well as between each form element and a multiple-label concept nested inside of it, some embodiments generate either an n-ary relationship set or a set of binary relationship sets. If the multiple-label element is not the only form element in the form, some embodiments generate an n-ary relationship set, otherwise embodiments generate a set of binary relationship sets between the form-title concept and each of the concepts in the multiple-label element. Thus, in the present example, some embodiments generate an n-ary relationship set among the Country concept 302, the Population concept 328, and the Year concept 329. The present running example does not illustrate the case of a multiple-label form element by itself with no other form elements. As an example consider a multiple-label form element by itself nested inside a form whose title is Country. The labels might be Name, Capital, Population (2005 est.), and Size (sq. km.), and the rows in the multiple-label field would be various country names along with their capitals, populations, and sizes. In this case, Embodiments would generate four functional binary relationship sets: from a Country concept to a Name concept, from the Country concept to a Capital concept, from the Country concept to a Population (2005 est.) concept, and from the Country concept to a Size (sq. Km.) concept.

Choice form elements. Some embodiments generate a non-functional binary relationship set between the form-title concept and a top-level choice form element. Thus in the running example, some embodiments would generate a non-functional binary relationship set between the Country concept 302 and the Life Expectancy concept 330 as FIG. 1B shows. Similar to other nested form elements, nested choice form elements have the same relationships to their parent form elements as do top-level choice form elements to the form title concept. For both mutually-exclusive and non-exclusive choice elements, some embodiments generate a generalization/specialization relationship with the header label as the generalization concept and each of the labels on the selection list as specialization concepts. From the example in FIG. 2, embodiments therefore generate a non-exclusive choice element for the generalization/specialization with the Life Expectancy concept 330 as the generalization and the Male Life Expectancy concept 332 and the Female Life Expectancy concept 334 as specializations. Nesting choice form elements inside of choice specification elements extends the generalization/specialization hierarchy. Header labels of nested generalizations match upper-level specialization labels. The user could, for example, extend the hierarchy by nesting Male Life Expectancy 40-60 and Male Life Expectancy 60+ under the upper-level specialization Male Life Expectancy. In this case, embodiments would generate concepts for these specializations which would appear as specialization concepts for the generalization Male Life Expectancy.

Embodiments may impose no constraints on generalization/specialization for non-exclusive form elements. For mutually-exclusive form elements, Embodiments add a plus symbol to the triangle to designate the mutual exclusion. This, however, would be inappropriate for the present example because the user may know that as life-expectancy values are harvested, some male and female life-expectancy values may be the same—thus, the male and female values are not mutually exclusive.

As for determining the lexicality of generalization/specialization hierarchies, OSM language rules require concepts in the entire hierarchy to be all lexical or all non-lexical. Embodiments generate the hierarchy with all lexical concepts if all leaf form elements in the hierarchy expect a single value as is the case in the present example. Otherwise, embodiments generate all concepts in the entire hierarchy as non-lexical.

Although some embodiments are able to generate all concepts, all relationship sets, and all generalization/specialization hierarchies, some embodiments can generate only some of the constraints that might be desirable. Some embodiments know that relationship-set constraints from parent concept to child concept should be functional when the child concept is a single-label/single-value form element. From a form specification alone, however, some embodiments are not able to determine whether the inverse direction of a binary relationship set is functional. Names of countries, for example, might be unique and therefore functionally determine countries. In these cases, some embodiments initially imposes no constraints. Thus, in the present example, the Name-Country relationship set is not bijective. Embodiments, however, can later modify constraints based on observation as the embodiments harvest information from source documents. The optional (i.e., non-mandatory) constraints on the three relationship set in FIG. 3, illustrated by the circles in the connecting edged, appear initially because an embodiment observes that the first page (i.e. web page 200) from which it harvests information has no Geographic Coordinate, no Water area, and no Land area. Some embodiments are reticent, however, to establish constraints where they observe non-violations such as after harvesting from several pages and seeing that capital-city names are unique. Instead, after gathering sufficiently many examples, embodiments may ask its human users to confirm its educated guess.

Path and Instance Recognition. As noted above, to fill in the form, users manually transfer values of interest from the source document (e.g. web page 200) to the target entry blanks in the form (e.g. form 100). Each target form entry blank can contain one or more data instances. To enter an instance, a user highlights the instance with a mouse and then clicks on an insert icon in the field in which the value should appear. For example, in FIG. 2, the form element 126 with label Religion is a multiple-value form element, which the user may fill in with five data instances. Additionally, each instance itself can contain one or more highlighted values. For example, the instance for the Geographic Coordinate labeled element 124 could contain two highlighted values one for longitude and one for latitude perhaps from two different data cells in a table from a source page. To indicate that multiple component values should be concatenated together to form a single value, after clicking on the insert icon 206-3 to add the first component, a user clicks on the concatenate icon 244-3 to concatenate subsequent components. When filling in multiple-label/multiple-value form elements like the Population-Year form element 128, users must be careful to put related values in the same row. For example, value "10,264,212" in the form 100 in FIG. 2 should go to the same row as "2001".

Although users fill in the form manually, they only need to do this manual transformation once for a single page from a hidden-web site. To harvest information from the remaining pages in the same hidden-web site, embodiments determine the layout pattern for target instance values in the first page and use these patterns to extract target instance values from remaining pages. Embodiments accomplish this task by using path recognition and instance recognition. In some embodiments, path recognition is accomplished by embodiments being able to identify the path in the HTML DOM-tree leading to the node that contains each highlighted string. In some embodiments, instance recognition is accomplished by embodiments being able to identify the substrings in one or more DOM-tree nodes that constitute the instance values.

Notably, while embodiments may function with only a single manual transformation, multiple manual transformations can be used to further train the system to better recognize values for automated data extraction.

Additionally, as noted above, embodiments may be implemented where user input is requested from the embodiments. For example, embodiments may comprise computer implemented modules which determine that extracted data may not be accurate and thereafter prompting the user for input to facilitate correlating extracted data items. Determining that extracted data may not be accurate may be accomplished in a number of different ways. For example, a computer module may determine that data is missing from an expected location based on the context. This may include, for example, determining that a found node does not include an expected context. Context will be discussed in more detail below. Alternatively, a computer module may determine that a data correlation fails validation against another ontology (e.g. expert created ontology, such as a lexicon, as opposed to the user view created). Alternatively, a computer module may determine that a data value violates a range constraint (e.g. a date of 3010 or price of goods is $24 quadrillion).

Path Recognition. Path recognition, in one embodiment, is about locating the DOM-tree node of a user-highlighted value from a source hidden-web page by using the structural layout pattern of the hidden-web site. Knowing the path, embodiments can then automatically locate corresponding DOM-tree nodes (sibling nodes) that contain values of interest from the remaining pages in the same hidden-web site. For example, if a user highlights "Czech Republic" in the sample web page 200 in FIG. 2, embodiments will collect all the values under "Country (long form)" from the remaining pages of the same web site.

Inasmuch as hidden-web pages are usually sibling pages with regular structure, the user can usually locate the corresponding DOM-tree node in another sibling page by following the same XPath from the root to the current node. However, XPath does not always locate sibling nodes even though sibling pages usually have the same base structure because some variations might exist. Some sibling pages might have additional or missing tables, and some sibling tables might have additional or missing labels. Thus, sometimes following the XPath does not locate the sibling node for which the user may be looking.

Additional functionality can be implemented, however, that can deal with these variations in sibling pages. In particular, a tool known as TISP, available from Brigham Young University computer science department can be used for some variations. Given a table in a sample page, TISP can automatically locate sibling tables of given table in all other sibling pages. In addition, inasmuch as TISP can interpret sibling tables automatically, embodiments can obtain the sibling nodes from each of the sibling tables by first locating the corresponding labels and then locating the value nodes for the labels. For example, to obtain all the sibling nodes for Name of Country in the sibling pages of the page in FIG. 3, TISP first automatically interprets the table. Embodiments now know that the first column of this table is a column of labels and that the label "Country (long form)" is the label for the values to be collected. Then for the remaining sibling pages, TISP can locate the corresponding sibling tables. In each table, Embodiments looks for the label "Country (long form)" and then locates the corresponding value nodes.

Instance Recognition. In some examples, a user-highlighted value can be the entire DOM-tree node (e.g, "Prague" in FIG. 2) or a proper subpart of the string that constitutes the DOM-tree node (e.g., just the populated value in FIG. 2). Note that in some embodiments, if an identified DOM-tree node is not already a string with no internal formatting tags, embodiments may remove the tags and convert the DOM-tree node to a simple string. When a user-highlighted value is a proper subpart of the string that constitutes the DOM-tree node, embodiments know how to find the right subpart within the DOM-tree node. Moreover, inasmuch as a value can be composed of one or more highlighted values from one or more DOM-tree nodes (e.g., when longitude and latitude are in separate DOM-tree nodes), embodiments know how to compose values from different substrings of different nodes from the source page.

Considering these possibilities, the user may observe that there are two kinds of patterns: (1) individual patterns for entire strings, proper substrings, and string components and (2) list patterns. Particularly, for list patterns, but also as context for individual pattern, some embodiments have a default list of delimiters: ",", ";", "|", "/", "\", "(", ")", "[", "]", "{", "}", sos (start of string) and eos (end of string). While these examples are shown, it should be appreciated that other sets of delimiters may be implemented. Some embodiments may have a library of regular-expression recognizers for values in common formats, such as numbers, numbers with commas, decimal numbers, positive/negative integers, percentages, dates, times, and currencies. An individual pattern has left and right context, a regular-expression instance recognizer, and an optional appearance number of the substring. For example, for the highlighted area value "78,866.00", the left context can be "\b" (word boundary) and the right context can be "\ssq", the regular-expression recognizer can be decimal number, and the appearance number is 2 (the second decimal number in the string). A list pattern has a left context, a right context, a regular-expression recognizer, and a delimiter. The list of agriculture products in FIG. 2 would have as its left context sos, as its right context eos, as its regular-expression recognizer "*" (any string), and as its delimiter "(,\s*)| (;\s*)" (either a comma space or a semicolon space).

Attention is now directed to how embodiments detect patterns. Some embodiments first determine whether a pattern is an individual pattern or a list pattern. Given a DOM-tree node and all the highlighted values in that node, embodiments may groups the highlighted values that go to the same form entry together. If there is only one highlighted value that goes to a form entry, some embodiments recognize it as an individual pattern; and if there are many highlighted values that go to a form entry, some embodiments recognize it as a list pattern.

For both individual and list patterns, embodiments may next determine the context information, and the regular expression pattern of the substrings of interest. To determine the left or the right context of a highlighted value in a DOM-tree node, embodiments may initially take the substring that is on the left or on the right of the highlighted substring until it reaches other highlighted values or the beginning or the end of the whole node string. Embodiments can further generalize the context. First, if some of the context is recognizable as instance of one of the regular-expression recognizers, embodiments substitute the recognized substring in the context by the recognizer. Second, embodiments can generalize the context information when it sees more sibling-node contents during its harvesting phase of operation. Sometimes embodiments cannot locate the context information in a newly encountered sibling content. This usually means that the initial context is too specific in the original sample page. Embodiments may then try to generalize the context by comparing context strings with the pattern and allowing non-delimiter characters to be replaced by an expression that permits any characters.

If a highlighted substring can be recognized by a regular-expression recognizer in a library, embodiments use it as the regular-expression recognizer for the pattern. If not, then the instance recognizer is an expression that recognizes any string. In this case, proper recognition depends on the left and right context, and for individual values, perhaps also the appearance number, and for lists also the delimiter.

Sometimes, with the same context and regular-expression recognizer, embodiments locate more than one substring from a DOM-tree node, but an individual pattern should only recognize one substring. In this case, an appearance number can help. An appearance number n tells embodiments which substring of the several substrings recognized by the context and regular-expression recognizer is the one the user wants. The user may assume that the sibling pages are highly regular and all the values should appear in the same order over sibling pages. So if the highlighted value appears as the nth recognized value, embodiments may assume that it should extract the nth value in the remaining sibling pages.

For delimiters in list patterns, embodiments may compare the substrings between highlighted values. Looking particularly for delimiters in a list of delimiters, embodiments may attempt to identify a simple delimiter-separated list. Embodiments may then construct a regular expression for the delimiter. The agriculture list in FIG. 2 is an example. For this list embodiments may create the delimiter expression ",|;". For more complex cases such as the religions list in FIG. 2, the list separator is not merely a simple delimiter. In the religions list a percentage plus a comma separate the names of the religions, and the delimiter expression should be "\s*\d[1-2] (.\d*)?%,\s*". Embodiments may generate this delimiter expression by (1) discovering that the percentage recognizer in the library recognizes part of every substring between highlighted values, (2) observing that a comma follows every percentage, and (3) noticing that the combination of the percentage and the comma covers the substrings. In general, embodiments may check substrings for library instance recognizers and standard delimiters as illustrated in the religions example; when this is insufficient to cover all of the substrings, embodiments may add general character recognizers, as necessary, to cover the substrings.

Semantic Annotation. With path recognition and instance recognition, embodiments can locate the information of interest from all the sibling pages for a hidden-web site and represent it with respect to the generated ontology. Inasmuch as embodiments have already "understood" each page, the user may can immediately and automatically semantically annotate values for each page in the site using the ontology as the annotation ontology. This means that the user can transform a source page to a semantic web page, which is machine-understandable. Embodiments can annotate each page and save the annotated information in a searchable data structure such as a searchable file. The searchable data structure may be, for example, an OWL file, an RDF file, a spreadsheet file, a csv (comma separated value) file, or a database file.

The following discussion and XML code segments illustrate the annotated information for the web page 200 in FIG. 2 with respect to the ontology in FIG. 3.

The following illustrates a sample RDF Annotation for Name Spaces for the running example:

```
1: <rdf:RDF
2: xmlns:ann="http://dithers.cs.byu.edu/owl/ontologies/annotation#"
3: xmlns:rdf="http://www.w3.org/1999/02/22-rdf-syntax-ns#"
4: xmlns:country="http://dithers.cs.byu.edu/owl/ontologies/country#">
```

Lines 2-4 above give the name spaces in the RDF file. The ann name space (Line 2) describes the annotation tags. The country name space (Line 4) describes the Country ontology (FIG. 3). Both ann and country are OWL ontologies—ann created by us for the purpose of annotation as discussed here and country generated from the OSM description in FIG. 3.

The following illustrates a sample RDF Annotation for Country for the running example:

```
 5: <country:Country rdf:ID="Country_1">
 6: <ann:inResource rdf:resource="#resource1"/>
 7: <country:Country-Name rdf:resource="#Name_1"/>
 8: <country:Country-Capital rdf:resource="#Capital_1"/>
 9: <country:Country-Religion rdf:resource="#Religion_1"/>
10: <country:Country-Religion rdf:resource="#Religion_2"/>
11: <country:Country-Religion rdf:resource="#Religion_3"/>
12: <country:Country-Religion rdf:resource="#Religion_4"/>
13: <country:Country-Religion rdf:resource="#Religion_5"/>
14: <country:Country-CountryPopulationYear
     rdf:resource="#CountryPopulationYear_1"/>
15: <country:Country-CountryPopulationYear
     rdf:resource="#CountryPopulationYear_2"/>
16: <country:Country-LifeExpectancy
     rdf:resource="#MaleLifeExpectancy_1"/>
17: <country:Country-LifeExpectancy
     rdf:resource="#FemaleLifeExpectancy_1"/>
18: <country:Country-Area rdf:resource="#Area_1"/>
19: </country:Country>
20:
```

Lines 5-19 define an instance Country_1, for the Country class. Line 5 introduces the instance identifier for the annotated web page 200 in FIG. 2. An InResource tag tells us that the source file is #resource1. Lines 7-18 tell us the properties of Country_1 and list the instances as RDF triples. Inasmuch as Country-Name, Country-Capital, and Country-Area are all functional binary relationship sets, there is only one instance of Name, Capital, and Area, each related to Country_1. Inasmuch as Country-Religion is a non-functional binary relationship set, there can be more than one instance of Religion for each instance of Country. Through the property Country-Religion, Country_1 connects to #Religion_1 through #Religion_5, which are the five instances of Religion that appear in FIG. 2. There is an n-ary relationship set between Country, Population, and Year. Inasmuch as OWL only supports binary relationship sets, some embodiments generate a new class, CountryPopulationYear, to represent this relationship set. Through the property Country-CountryPopulationYear, Country_1 connects to #CountryPopulationYear 1 and #CountryPopulationYear 2, which are the two instances of the CountryPopulationYear relationship set in FIG. 2. Through the property Country-LifeExpectancy, Country_1 also connects to #MaleLifeExpectancy_1, which is an instance of MaleLifeExpectancy, and #FemaleLifeExpectancy_1, which is an instance of FemaleLifeExpectancy. Inasmuch as MaleLifeExpectancy and FemaleLifeExpectancy are subclasses of LifeExpectancy, they inherit the property Country-LifeExpectancy from their parent class.

The following code samples show annotation declaration for value instances of Name, Capital, Religion, MaleLifeExpectancy, and FemaleLifeExpectancy.

The following illustrates a sample RDF Annotation for Single-Label/Single-Value Elements for the running example:

```
21: <country:Name rdf:ID="Name 1">
22: <ann:inResource rdf:resource="#resource1"/>
23: <ann:OffsetOnHTMLPage>8765</ann:OffsetOnHTMLPage>
24: <ann:HTMLText>Czech Republic</ann:HTMLText>
25: <country:NameValue>Czech Republic</country:NameValue>
26: <country: Name-Country rdf:resource="#Country_1"/>
27: </country:Name>
28:
29: <country:Capital rdf:ID="Capital 1">
30: <ann:inResource rdf:resource="#resource1"/>
31: <ann:OffsetOnHTMLPage>8896</ann:OffsetOnHTMLPage>
32: <ann:HTMLText>Prague</ann:HTMLText>
33: <country:CapitalValue>Prague</country:CapitalValue>
34: <country:Capital-Country rdf:resource="#Country_1"/>
35: </country:Capital>
36:
```

The following illustrates a sample RDF Annotation for Multiple-Label/Multiple-Value Elements for the running example:

```
37: <country:Religion rdf:ID="Religion_1">
38: <ann:inResource rdf:resource="#resource1"/>
39: <ann:OffsetOnHTMLPage>9806</ann:OffsetOnHTMLPage>
40: <ann:HTMLText>atheist</ann:HTMLText>
41: <country:ReligionValue>atheist</country:ReligionValue>
42: <country:Religion-Country rdf:resource="#Country_1"/>
43: </country:Religion>
44:
45: <country:Religion rdf:ID="Religion_2">
46: <ann:inResource rdf:resource="#resource1"/>
47: <ann:OffsetOnHTMLPage>9821</ann:OffsetOnHTMLPage>
48: <ann:HTMLText>Roman Catholic</ann:HTMLText>
49: <country:ReligionValue>Roman Catholic</country:ReligionValue>
50: <country:Religion-Country rdf:resource="#Country_1"/>
51: </country:Religion>
52:
53: <country:Religion rdf:ID="Religion_3">
54: <ann:inResource rdf:resource="#resource1"/>
55: <ann:OffsetOnHTMLPage>9843</ann:OffsetOnHTMLPage>
56: <ann:HTMLText>Protestant</ann:HTMLText>
57: <country:ReligionValue>Protestant</country:ReligionValue>
58: <country:Religion-Country rdf:resource="#Country_1"/>
59: </country:Religion>
60:
61: <country:Religion rdf:ID="Religion_4">
62: <ann:inResource rdf:resource="#resource1"/>
```

```
63: <ann:OffsetOnHTMLPage>9860</ann:OffsetOnHTMLPage>
64: <ann:HTMLText>Orthodox</ann:HTMLText>
65: <country:ReligionValue>Orthodox</country:ReligionValue>
66: <country:Religion-Country rdf:resource="#Country_1"/>
67: </country:Religion>
68:
69: <country:Religion rdf:ID="Religion_5">
70: <ann:inResource rdf:resource="#resource1"/>
71: <ann:OffsetOnHTMLPage>9873</ann:OffsetOnHTMLPage>
72: <ann:HTMLText>other</ann:HTMLText>
73: <country:ReligionValue>other</country:ReligionValue>
74: <country:Religion-Country rdf:resource="#Country_1"/>
75: </country:Religion>
76:
```

The following illustrates a sample RDF Annotation for n-ary Relationship Sets for the running example:

```
77: <country:CountryPopulationYear rdf:ID="CountryPopulationYear_1"/>
78: <ann:inResource rdf:resource="#resource1"/>
79: <country:CountryPopulationYear-Year rdf:resource="Year_1"/>
80: <country:CountryPopulationYear-Population rdf:resource="Population_1"/>
81: <country:CountryPopulationYear-Country rdf:resource="#Country_1"/>
82: </country:CountryPopulationYear>
83:
84: <country:CountryPopulationYear rdf:ID="CountryPopulationYear_2">
85: <ann:inResource rdf:resource="#resource1"/>
86: <country:CountryPopulationYear-Year rdf:resource="Year_2"/>
87: <country:CountryPopulationYear-Population rdf:resource="Population_2"/>
88: <country:CountryPopulationYear-Country rdf:resource="#Country_1"/>
89: </country:CountryPopulationYear>
90:
91: <country:Population rdf:ID="Population_1">
92: <ann:inResource rdf:resource="#resource1"/>
93: <ann:OffsetOnHTMLPage>9224</ann:OffsetOnHTMLPage>
94: <ann:HTMLText>10,264,212</ann:HTMLText>
95: <country:PopulationValue>10264212</country:PopulationValue>
96: <country:Population-CountryPopulationYear rdf:resource="#CountryPopulationYear_1"/>
97: </country:Population>
98:
99: <country:Year rdf:ID="Year_1">
100: <ann:inResource rdf:resource="#resource1"/>
101: <ann:OffsetOnHTMLPage>9241</ann:OffsetOnHTMLPage>
102: <ann:HTMLText>2001</ann:HTMLText>
103: <country:YearValue>2001</country:YearValue>
104: <country:Year-CountryPopulationYear rdf:resource="#CountryPopulationYear_1"/>
105: </country:Year>
106:
107: <country:Population rdf:ID="Population_2">
108: <ann:inResource rdf:resource="#resource1"/>
109: <ann:OffsetOnHTMLPage>9389</ann:OffsetOnHTMLPage>
110: <ann:HTMLText>8,015,315</ann:HTMLText>
111: <country:PopulationValue>8015315</country:PopulationValue>
112: <country:Population-CountryPopulationYear rdf:resource="#CountryPopulationYear_2"/>
113: </country:Population>
114:
115: <country:Year rdf:ID="Year_2">
116: <ann:inResource rdf:resource="#resource1"/>
117: <ann:OffsetOnHTMLPage>9348</ann:OffsetOnHTMLPage>
118: <ann:HTMLText>2050</ann:HTMLText>
119: <country:YearValue>2050</country:YearValue>
120: <country:Year-CountryPopulationYear rdf:resource="#CountryPopulationYear_2"/>
121: </country:Year>
122:
```

The following illustrates a sample RDF Annotation for Generalization/Specialization for the running example:

```
123: <country:MaleLifeExpectancy rdf:ID="MaleLifeExpectancy 1">
124: <ann:inResource rdf:resource="#resource1"/>
125: <ann:OffsetOnHTMLPage>10009</ann:OffsetOnHTMLPage>
126: <ann:HTMLText>71.23</ann:HTMLText>
127: <country:MaleLifeExpectancyValue>71.23</country:MaleLifeExpectancyValue>
128: <country:LifeExpectancy-Country rdf:resource="#Country_1"/>
129: </country:MaleLifeExpectancy>
130:
131: <country:FemaleLifeExpectancy rdf:ID="FemaleLifeExpectancy 1">
132: <ann:inResource rdf:resource="#resource1"/>
133: <ann:OffsetOnHTMLPage>10021</ann:OffsetOnHTMLPage>
134: <ann:HTMLText>78.43</ann:HTMLText>
```

-continued

```
135: <country:FemaleLifeExpectancyValue>78.43</country:FemaleLifeExpectancyValue>
136: <country:LifeExpectancy-Country rdf:resource="#Country_1"/>
137: </country:FemaleLifeExpectancy>
138:
```

The following illustrates a Sample RDF Annotation for Nested Form Elements for the running example:

```
139: <country:Area rdf:ID="Area_1">
140:   <ann:inResource rdf:resource="#resource1"/>
141:   <country:Area-Total rdf:resource="Total_1"/>
142:   <country:Area-Country rdf:resource="#Country_1"/>
143: </country:Area>
144:
```

Lines 139-143 show the declarations of #Area_1. #Area_1 connects to #Total_1 through the property Area-Total. Lines 145-151 show the annotation declaration for Total_1.

Annotating a value whose component parts appear in different places in a source document requires a more complex annotation specification. As an example, the following example shows how embodiments keep track of values concatenated from component parts in an annotated RDF file.

The following illustrates Sample RDF Annotation for Instance Concatenation in the present running example.

```
<country:GeographicCoordinate rdf:ID="GeographicCoordinat_1"> ...
    <country:GeographicCoordinate-Country rdf:resource="#Country_1"= >
    <country:GeographicCoordinateValue>49 45 N 15 30 E</country:GeographicCoordinateValue>
    <ann:hasComponent rdf:resource="#GeographicCoordinateComponent_1"= >
    <ann:hasComponent rdf:resource="#GeographicCoordinateComponent_2"= >
</country:GeographicCoordinate>
...
<ann:AnnotatedHTMLText rdf:ID="GeographicCoordinateComponent_1"> ...
    <ann:inResource rdf:resource="#resource3"= >
    <ann:OffsetOnHTMLPage>487</ann:OffsetOnHTMLPage>
    <ann:HTMLText>49 45 N</ann:HTMLText>
</ann:AnnotatedHTMLText>
...
<ann:AnnotatedHTMLText rdf:ID="GeographicCoordinateComponent_2"> ...
    <ann:inResource rdf:resource="#resource3"= >
    <ann:OffsetOnHTMLPage>530</ann:OffsetOnHTMLPage>
    <ann:HTMLText>15 30 E</ann:HTMLText>
</ann:AnnotatedHTMLText>
```

-continued

```
145: <country:Total rdf:ID="Total_1">
146:   <ann:inResource rdf:resource="#resource1"/>
147:   <ann:OffsetOnHTMLPage>9044</ann:OffsetOnHTMLPage>
148:   <ann:HTMLText>78,866.00</ann:HTMLText>
149:   <country:TotalValue>78866.00</country:TotalValue>
150:   <country:Total-Area rdf:resource="#Area_1"/>
151: </country:Total>
152:
153: </rdf:RDF>
```

In each annotation declaration, the in Resource tag tells which source document the information comes from. The OffsetOnHTMLPage tag tells where to locate the specific substring in the source document, and the HTMLText tag records the component's text. The <label>Value tag tells the value of the instance, which for string is usually the same as the HTMLText value, but for RDF types such as integer, and date-time, the value is reformatted for the type.

The example illustrated above including lines 77-122 shows declarations for instances #CountryPopulationYear_1 and #CountryPopulationYear_2. Each of these two instances also connects to an instance of Year, an instance of Population, and an instance of Country as Lines 79-81 and 86-88 show. Lines 91-121 show the annotation declarations of these instances. Observe that the PopulationValue instances (Lines 95 and 111) are reformatted as integers. Some embodiments make this adjustment based on having recognized these values with library recognizers, which have built in converters for RDF types.

In some embodiments, all concatenated values are stored similarly. Suppose in an original file, the information about GeographicCoordinate appears as "49 45 N", and "15 30 E" and comes from different places in the web page or even from different web pages. In the ontology view, the user may want to show them as one single value "49 45 N 15 30 E". As the code illustrated above shows, embodiments may store the concatenated value as GeographicalCoordinate_1 and then generate two objects GeographicCoordinateComponent_1 and GeographicCoordinateComponent_2, one for each component part of the value and makes them as hasComponent-properties of GeographicalCoordinate_1 declaration.

After storing the information in an RDF file, the user may query it. In some embodiments, a sample SPARQL query can be generated in the Twinkle interface. The present sample query finds the Czech female life expectancy. Using the filter statement, SPARQL can find all the instances of NameValue that contain string "Czech". Then through the property NameValue, SPARQL can locate all the Name instances the user may are looking for, in the present example, #Name 1. Further though the property Country-Name, SPARQL locates #Country_1. Finally through the property Country-LifeExpectancy, SPARQL can find the instances #FemaleLifeExpectancy 1 and #MaleLifeExpectancy 1. Then follow the property FemaleLifeExpectancyValue, SPARQL can find the value the user may are looking for.

Embodiments can be used to help users who do not know conceptual modeling to create ontologies of their own, and then to harvest information with respect to these created ontologies. The user may want to make this process as convenient as the user can. One way the user may can help is to make the form creation process automatic or semi-automatic rather than manual. Sometimes users of one hidden-web site S1 would like to view the data of another hidden-web site with respect to the organization of data in S1. If the user could reverse engineer the organization of S1 into a form, the user could then allow users to fill in the form with values from a page of S2. The user could then harvest the information from all the pages of S2 with respect to the view of S1. As the user may explain in this section TISP used in conjunction with Embodiments allows us to provide users with this possibility.

Often tables are "mirror images" of forms. When they are and when they only use Embodiments equivalent layout structures, the user may can immediately generate Embodiments forms for them. To generate forms from tables, some embodiments first apply other tools to interpret sibling tables and determine their layout structures. One such tools is described in United States patent application HIDDEN-WEB TABLE INTERPRETATION, CONCEPTULIZATION AND SEMANTIC ANNOTATION filed concurrently herewith, an incorporated herein by reference in its entirety. When the layout structure identified using these tools satisfies the constraints of the defined forms in an embodiment, embodiments can recast the layouts as forms, such as the form illustrated in FIG. 1B. To obtain a table for the form, some embodiments use the name of the web site as the form title.

After having a form generated using the sibling tables tool, users may wish to alter the form before harvesting additional information. To illustrate this idea and to show how a user can create a form from one site and harvest from another, an example is illustrated.

Suppose the user is interested in buying a car, and the user may be trying to find information about used cars from different online dealer web sites or car inventory web sites. The user may care about the make, the model, the engine information, the color, and the mileage. The user may search around and find a web page. The user may wish that all web sites would present their information like the found web site does.

To make this happen, the user may apply embodiments that utilize the sibling web page tool to generate a form automatically so the user can harvest information from all the car web sites with respect to this view.

The user may see that the user does really need some information on the page. As such the user may decide to remove them from the form. However, the user may care about a specific breakdown of the engine information, such as the number of cylinders, the size of the engine, and the fuel injection type. Thus the user may nest three single-label/single-value form elements inside an engine element with labels Cylinder, Engine Size, and Fuel Injection.

Next the user may select a sample page for each of the additional web sites from which the user may want to harvest information and fill in the modified form for each sample page. Embodiments harvests the requested information from all the sibling pages in these web sites and semantically annotates each page.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Figure 4:
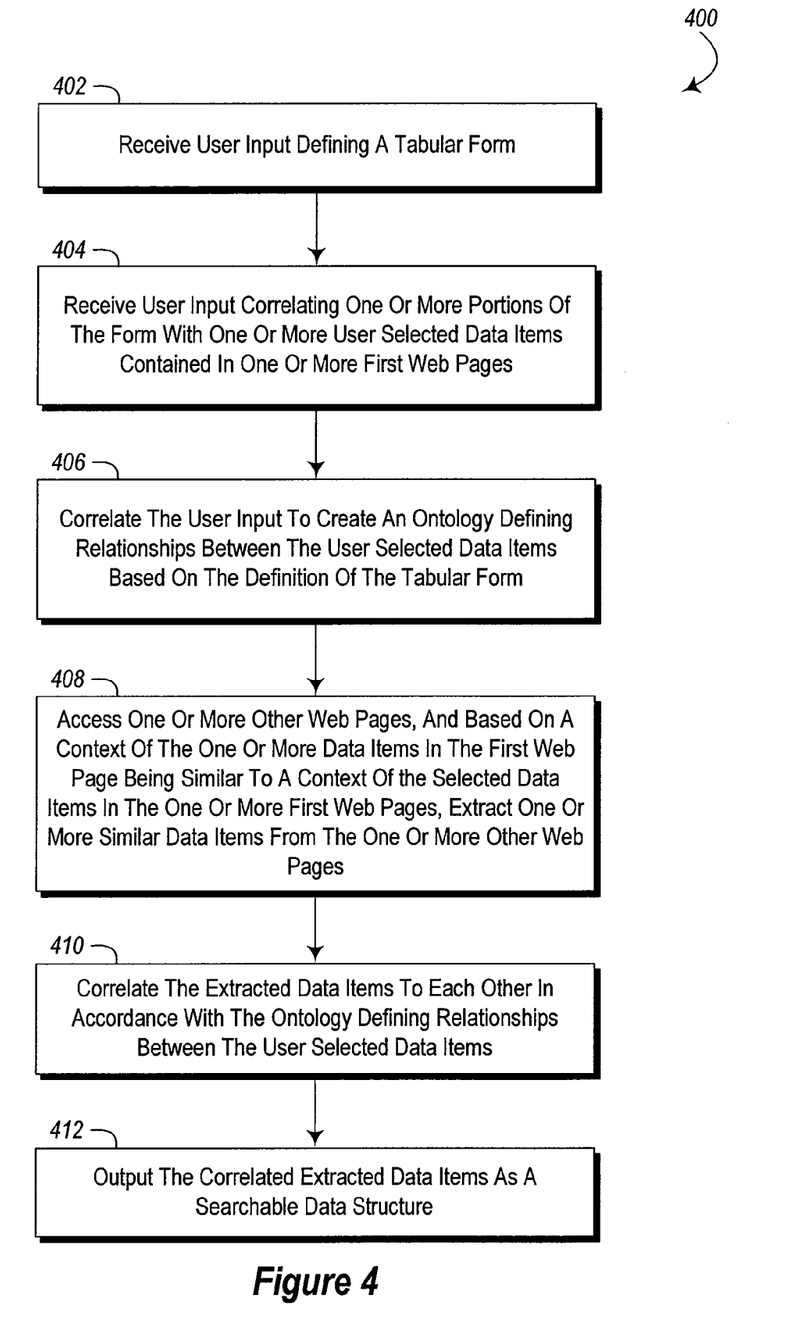
FIG. 4 illustrates a method of using forms to create and/or edit ontologies.

Referring now to FIG. 4, a method 400 is illustrated. The method 400 may be practiced in a computing environment and includes method acts for extracting data from web pages and organizing the extracted data in a user searchable format. The method includes at a graphical user interface, receiving user input defining a tabular form (act 402). For example, a user may use a graphical user interface such as that illustrated in FIGS. 1A and 1B to generate a table form 100. As noted in that example, functionality exists for a user to add single-label/single-value elements, single-label/multiple-value elements, multiple-label/multiple-value elements, mutually-exclusive choice elements, and non-exclusive choice elements.

The method 400 further includes at the graphical user interface, receiving user input correlating one or more portions of the form with one or more user selected data items contained in one or more first web pages (act 404). Such an example is illustrated in conjunction with the description of FIG. 2. In FIG. 2, a graphical user interface is used to copy data items from a web page 200 into the form 100.

The method 400 further includes a computer module correlating the user input to create an ontology defining relationships between the user selected data items based on the definition of the tabular form (act 406). FIG. 3 illustrates an ontology that has been created for the running example.

The method 400 further includes a computer module accessing one or more other web pages, and based on a context of the one or more data items in the first web page being similar to a context of the selected data items in the one or more first web pages, extracting one or more similar data items from the one or more other web pages (act 408). Additional details regarding extracting have been discussed previously herein and will also be discussed in more detail below. However, example extraction actions may include comparing Xpaths, sibling table comparisons, or other determination methods.

The method 400 further includes a computer module correlating the extracted data items to each other in accordance with the ontology defining relationships between the user selected data items (act 410) as illustrated above, in one embodiment, this may be performed by correlating relationships in a data structure such as an RDF file.

The method 400 further includes a computer module outputting the correlated extracted data items as a user searchable data structure (act 412).

The method 400 may be practiced where the searchable data structure is at least one of an OWL file, an RDF file, a spreadsheet file, a csv file, or a database file. These can then be searched using appropriate tools, such as for example, using a SPARQL query using the TWINKLE user interface.

Returning once again to the discussion of act 408, the method 400 may be practiced where extracting includes comparing an Xpath pointing to the user selected data items with an Xpath in the one or more other web pages from which the similar data items are extracted. In one embodiment, this may be facilitated by the method further including determining context of a node or set of nodes identified by the Xpath pointing to the user selected data items. Extracting then includes using the context to determine the extracted data items. For example, context may include a DOM selection range or an offset. Illustratively, in some embodiments, path recognition is accomplished by embodiments being able to identify the path in the HTML DOM-tree leading to the node that contains each highlighted string. In some embodiments, instance recognition is accomplished by embodiments being able to identify the substrings in one or more DOM-tree nodes that constitute the instance values.

In some embodiments, the context of a node or set of nodes may include a symbol or measurement unit. For example, such symbols may be at least one of a symbols like $, % or measurement units, such as oz, km, mi, kg, etc.

The method 400 may be practiced where the data items are a list or are included in a list. The context may include one or more of paragraphs, tabs, or punctuation.

The method 400 may be practiced where extracting is performed in a refined fashion by using a plurality of user input data selections. For example, a user may select a plurality of items to correspond to a table selection. As such, training of the system may be more accurate as more data is collected.

The method 400 may further include determining that the act of extracting may not be accurate and thereafter prompting the user for input to facilitate the act of correlating extracted data items. For example determining that the act of extracting may not be accurate may include determining that data is missing from an expected location based on the context. Alternatively or additionally, determining that the act of extracting may not be accurate may include determining that a found node does not include an expected context. Alternatively or additionally, determining that the act of extracting may not be accurate may include determining that a data correlation fails validation against another ontology. For example, the data correlation may fail and expert created ontology, such as a lexicon, as opposed to the user view. Alternatively or additionally, the act of extracting may not be accurate comprises determining that a data value violates a range constraint. For example, data representing a date may have a value of 3010 which would seem to be beyond a reasonable date range. In another example, a price of goods may be $24 quadrillion. Such constraints can be inferential, or could be set by hard explicit limits.

The method 400 may be practiced where extracting is performed in an automatic mode that does not allow for user interaction during the extraction. Alternatively, the method 400 may be practiced where extracting is performed in a user interactive mode where a user provides user input facilitating extraction during the extraction. For example, the user input facilitating extraction during the extraction may be provided as a result of a prompt to the user for each correlation, such as for example when there is uncertainty or unexpected results from the extraction. The user input facilitating extraction during the extraction may be provided as a result of a prompt to the user for each data item. This would be more time consuming, but would provide extreme accuracy when needed. Notably, the system could create an initial categorization of data and simply allow the user to confirm the initial creation, thus actually providing an efficiency benefit of hand sorting of data alone. The user input facilitating extraction during the extraction may be provided as a result of a prompt to the user when an error is detected.

The method 400 may be practiced where extracting is performed such that after a first iteration of extracting data, a list of suspected errors is provided to the user whereafter the user provides additional correlation, which is then used by subsequent iterations of the extraction.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of extracting data from web pages and organizing the extracted data in a user searchable format, the method comprising:
    at a graphical user interface, receiving user input defining a tabular form;
    at the graphical user interface, receiving user input correlating one or more portions of the form with one or more user selected data items contained in one or more first web pages;
    a computer module correlating the user input to create an ontology defining relationships between the user selected data items based on the definition of the tabular form;
    a computer module accessing one or more other web pages, and based on a context of the one or more data items in the first web page being similar to a context of the selected data items in the one or more first web pages, extracting one or more similar data items from the one or more other web pages;
    a computer module correlating the extracted data items to each other in accordance with the ontology defining relationships between the user selected data items;
    a computer module outputting the correlated extracted data items as a user searchable data structure.

2. The method of claim 1, wherein the searchable data structure is at least one of an OWL file, an RDF file, a spreadsheet file, a csv file, or a database file.

3. The method of claim 1, wherein extracting comprises comparing an Xpath pointing to the user selected data items with an Xpath in the one or more other web pages from which the similar data items are extracted.

4. The method of claim 3, further comprising determining context of a node or set of nodes identified by the Xpath pointing to the user selected data items and wherein extracting comprises using the context to determine the extracted data items.

5. The method of claim 4, wherein the context of a node or set of nodes comprises at least one of a symbol or measurement unit.

6. The method of claim 4, wherein the data items are a list or are included in a list, and wherein the context comprises at least one of paragraphs, tabs, or punctuation.

7. The method of claim 1, wherein extracting is performed in a refined fashion by using a plurality of user input data selections.

8. The method of claim 1, further comprising determining that the act of extracting may not be accurate and thereafter prompting the user for input to facilitate the act of correlating extracted data items.

9. The method of claim 8, wherein determining that the act of extracting may not be accurate comprises determining that data is missing from an expected location based on the context.

10. The method of claim 8, wherein determining that the act of extracting may not be accurate comprises determining that a found node does not include an expected context.

11. The method of claim 8, wherein determining that the act of extracting may not be accurate comprises determining that a data correlation fails validation against another ontology.

12. The method of claim 8, wherein determining that the act of extracting may not be accurate comprises determining that a data value violates a range constraint.

13. The method of claim 1, wherein extracting is performed in an automatic mode that does not allow for user interaction during the extraction.

14. The method of claim 1, wherein extracting is performed in a user interactive mode where a user provides user input facilitating extraction during the extraction.

15. The method of claim 14, wherein the user input facilitating extraction during the extraction is provided as a result of a prompt to the user for each correlation.

16. The method of claim 14, wherein the user input facilitating extraction during the extraction is provided as a result of a prompt to the user for each data item.

17. The method of claim 14, wherein the user input facilitating extraction during the extraction is provided as a result of a prompt to the user when an error is detected.

18. The method of claim 1, wherein extracting is performed such that after a first iteration of extracting data, a list of suspected errors is provided to the user whereafter the user provides additional correlation, which is then used by subsequent iterations of the extraction.

19. In a computing environment, a system for extracting data from web pages and organizing the extracted data in a user searchable format, the system comprising:
    one or more processors;
    a graphical user interface, wherein the graphical user interface:
        receives user input defining a tabular form; and receives user input correlating one or more portions of the form with one or more user selected data items contained in one or more first web pages;
    a first computer module implemented using computer executable instructions executed by one or more processors, wherein the first computer module correlates the user input received at the graphical user interface to create an ontology defining relationships between the user selected data items based on the definition of the tabular form;
    a second computer module implemented using computer executable instructions executed by one or more processors, wherein the second computer module accesses one or more other web pages, and based on a context of the one or more data items in the first web page being similar to a context of the selected data items in the one or more first web pages, extracts one or more similar data items from the one or more other web pages;
    a third computer module implemented using computer executable instructions executed by one or more processors, wherein the second computer module correlates the extracted data items to each other in accordance with the ontology defining relationships between the user selected data items; and
    a fourth computer module implemented using computer executable instructions executed by one or more processors, wherein the fourth computer module outputs the correlated extracted data items as a user searchable data structure.

* * * * *